No. 784,346. Patented March 7, 1905.

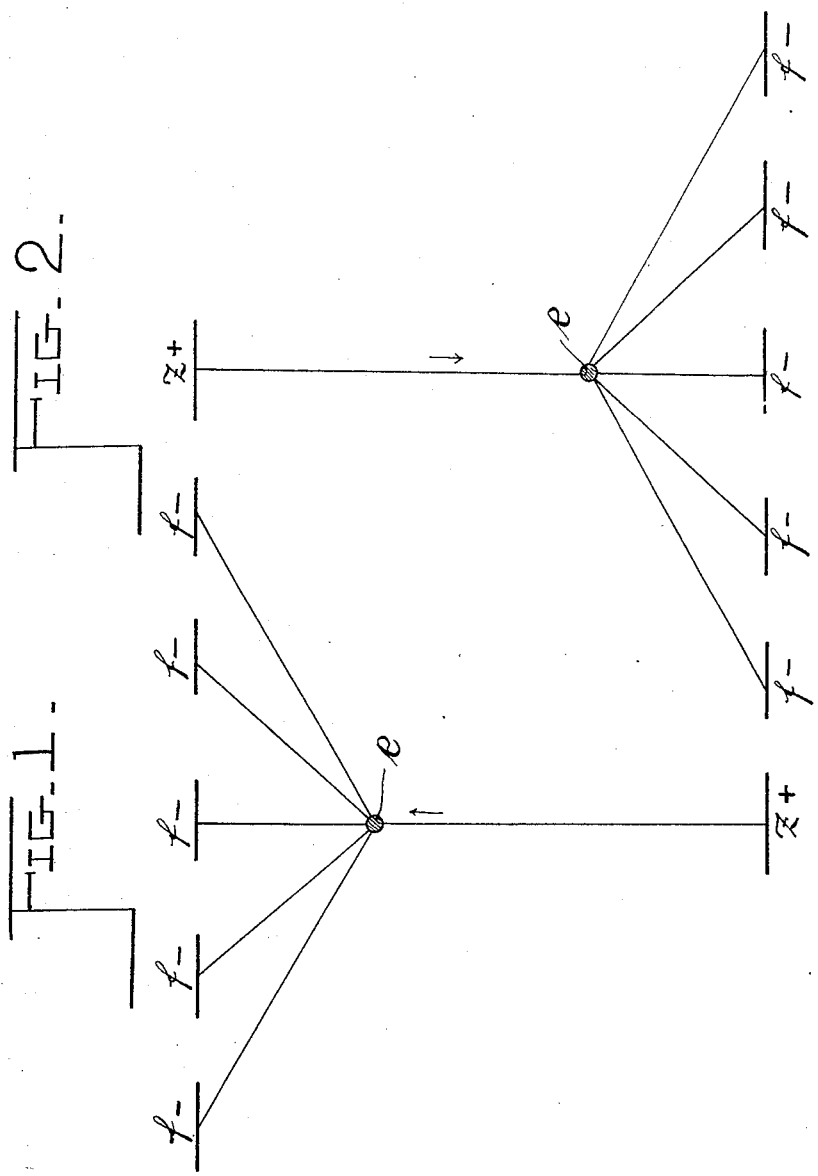

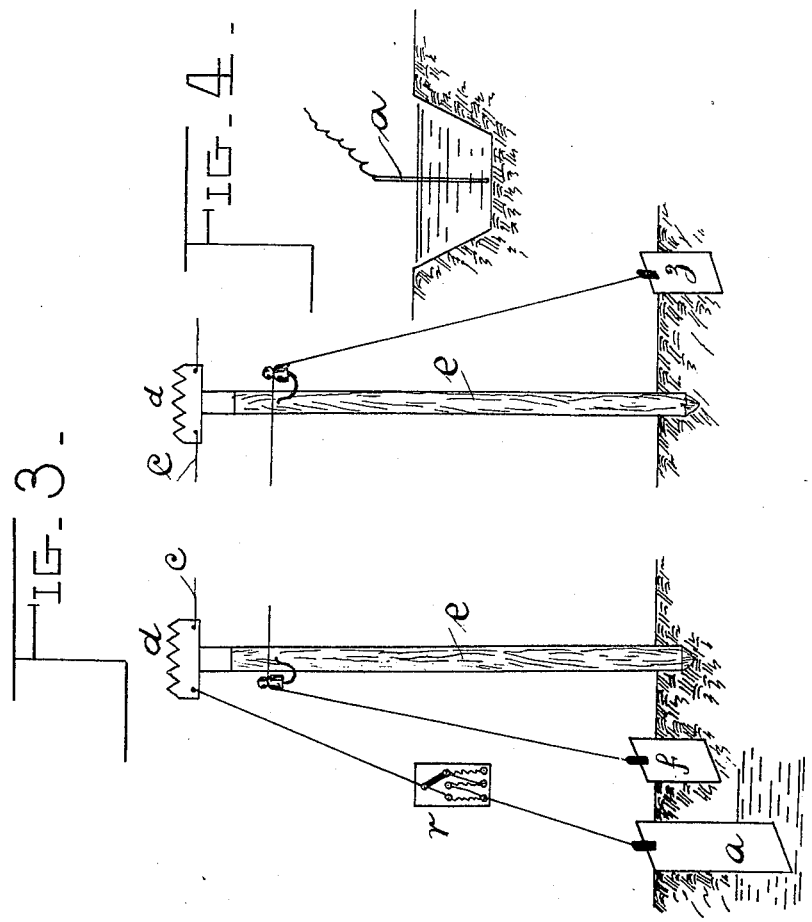

UNITED STATES PATENT OFFICE.

EUGÈNE PILSOUDSKY AND EUGÈNE RAGOZINE, OF ST. PETERSBURG, RUSSIA.

METHOD OF CULTIVATING PLANTS BY ELECTRICITY.

SPECIFICATION forming part of Letters Patent No. 784,346, dated March 7, 1905.

Application filed December 12, 1903. Serial No. 184,998.

*To all whom it may concern:*

Be it known that we, EUGÈNE PILSOUDSKY and EUGÈNE RAGOZINE, of St. Petersburg, Russia, have invented certain new and useful Improvements in the Method of Cultivating Plants by Electricity, of which the following is a specification.

A large number of attempts have been made to augment the productiveness of the earth and accelerate the growth of plants by the use of electricity; but these experiments have not, as a rule, proved successful, owing largely to the uncertainty of the effects produced and the lack of knowledge upon the part of the experimenters as to the real action of the electricity. Prior experimenters have usually employed galvanic currents set up between electrodes of dissimilar metals with all the positive electrodes at one side of the field and all the negative at the other.

Our invention consists in a method of cultivating plants by the combined use of galvanic currents and atmospheric electricity, and a long series of experiments conducted by us have enabled us to formulate certain rules by following which successful results can be obtained with practical certainty.

In the accompanying drawings, Figures 1 and 2 represent our new arrangement of the galvanic elements. Fig. 3 represents the means we employ to utilize the atmospheric electricity and to connect the galvanic elements. Fig. 4 represents the way the electrodes are placed in the earth.

For the galvanic elements we make use of iron plates as negative electrodes and zinc plates as positive electrodes. These plates should have about two square meters surface, and five iron plates are used for each zinc plate. In Fig. 1 the iron plates are represented at $f$ and the zinc plate at $z$. They are buried in the earth, as indicated in Fig. 4, by first digging a ditch, then placing the plate in the middle of said ditch, and finally packing earth around the plate, water being preferably used to insure a good contact. All the iron plates of each set are electrically connected by wires, the distance between adjacent plates being about one meter. The metallic connection between the zinc plate and the opposing set of five iron plates is carried by insulators on posts $e$, as indicated in Fig. 3.

The sets of galvanic elements, each set comprising one zinc plate and five iron plates, as stated, are set in rows about fifteen meters apart, and each successive set is reversed, as shown in Fig. 2—that is, the zinc plate replaces the iron plates, and vice versa—so that the current in adjoining portions of the field flows in opposite directions.

The atmospheric electricity is collected by toothed plates $d$, supported on the tops of the posts $e$, each plate $d$ being connected to the next. The end plates $d$ of the two outer rows of the field are connected to metal plates $a$, buried in the earth, as shown in Fig. 3, and a rheostat $r$ is introduced into the circuit. These upper wires $c$ for the atmospheric electricity are connected at intervals by cross-wires. The potential of the atmospheric electricity is constantly varying, and this sets up a current by induction in the parallel conductor, uniting the earth elements $f$ and $z$.

It is essential to the proper operation of our system that the circuits be closed only during the night and left open in the daytime. Furthermore, the connections between the earth elements must be opened for twenty-four hours each week in order that the electrodes may become depolarized. Every three years the iron plates must be renewed; but the rest of the installation can be used for a very long time.

It will be seen that our system of electrical earth culture is simple and inexpensive to install and maintain, and our experiments have demonstrated its efficiency and utility.

What we claim is—

The process of electroculture which consists in subjecting adjacent parallel sections of the earth to be treated to the action of galvanic currents flowing in opposite directions between buried plates of dissimilar metals connected by overhead conductors, and simultaneously setting up in the circuits formed by said conductors, plates and earth sections, currents induced by atmospheric electricity passing through parallel overhead conductors adapted to collect such electricity.

In witness whereof we have hereunto set our hands in the presence of two witnesses.

EUGÈNE PILSOUDSKY.
EUGÈNE RAGOZINE.

Witnesses:
H. A. LOVIAGUINE,
JOHN MUELLER.